United States Patent [19]
Eustache et al.

[11] Patent Number: 5,722,107
[45] Date of Patent: Mar. 3, 1998

[54] MOTOR VEHICLE WINDSCREEN WIPER COMPRISING AN IMPROVED SPRAY LINE

[75] Inventors: Jean-Pierre Eustache, Antony; Jean-Louis Roumegoux, Paris, both of France

[73] Assignee: Valeo Systemes d'Essuyage, La Verriere, France

[21] Appl. No.: 716,367

[22] PCT Filed: Jan. 17, 1996

[86] PCT No.: PCT/FR96/00075

§ 371 Date: Sep. 19, 1996

§ 102(e) Date: Sep. 19, 1996

[87] PCT Pub. No.: WO96/22207

PCT Pub. Date: Jul. 25, 1996

[30] Foreign Application Priority Data

Jan. 19, 1995 [FR] France .................. 95 00805

[51] Int. Cl.$^6$ .................. B60S 1/46; B60S 1/52
[52] U.S. Cl. .................. 15/250.04; 15/250.46
[58] Field of Search .................. 15/250.04, 250.05, 15/250.06, 250.03, 250.02, 250.01, 250.201, 250.46, 250.44, 250.48, 250.361, 250.43

[56] References Cited

U.S. PATENT DOCUMENTS

| 3,757,379 | 9/1973 | Benson | 15/250.04 |
| 4,782,547 | 11/1988 | Mohnach | 15/250.04 |
| 5,339,510 | 8/1994 | Roth et al. | 15/250.46 |

FOREIGN PATENT DOCUMENTS

| 311471 | 4/1989 | European Pat. Off. . | |
| 459302 | 12/1991 | European Pat. Off. | 15/250.201 |
| 518760 | 12/1992 | European Pat. Off. . | |
| 565443 | 10/1993 | European Pat. Off. | 15/250.201 |
| 604322 | 6/1994 | European Pat. Off. . | |
| 2267911 | 11/1975 | France . | |
| 2676694 | 11/1992 | France . | |
| 2681299 | 3/1993 | France . | |
| 1912037 | 9/1970 | Germany | 15/250.04 |
| 147946 | 9/1982 | Japan | 15/250.04 |

Primary Examiner—Gary K. Graham
Attorney, Agent, or Firm—Morgan & Finnegan, L.L.P.

[57] ABSTRACT

A motor vehicle windscreen wiper with a wiper blade comprising a main yoke fitted with a spray line which extends along one side surface thereof and is attached thereto at least by means of hinge pins for hingedly connecting secondary yokes to the ends of the main yoke.

16 Claims, 3 Drawing Sheets

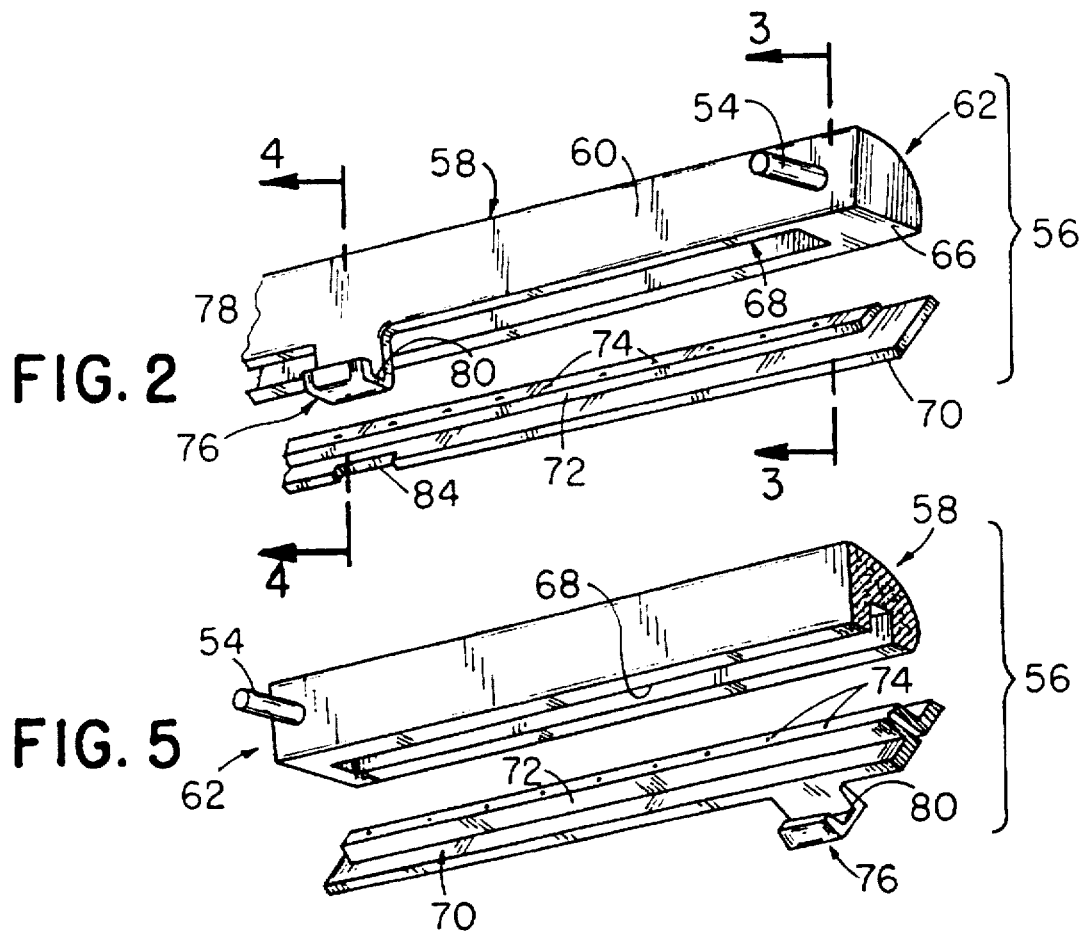
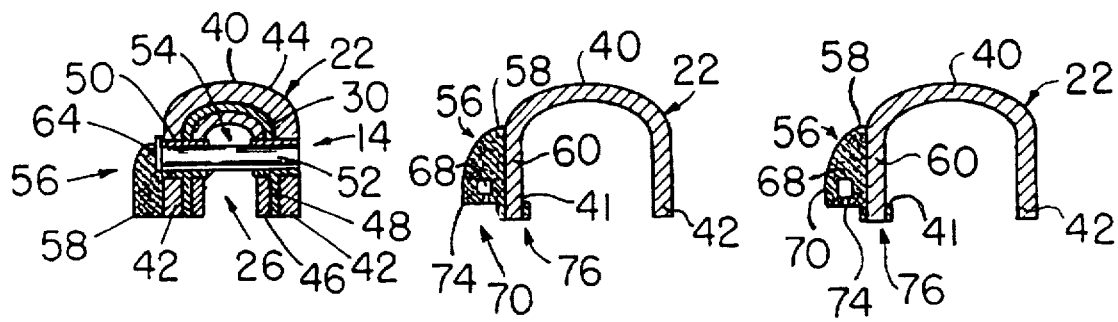
FIG. 2　　FIG. 5
FIG. 3　　FIG. 4a　　FIG. 4b

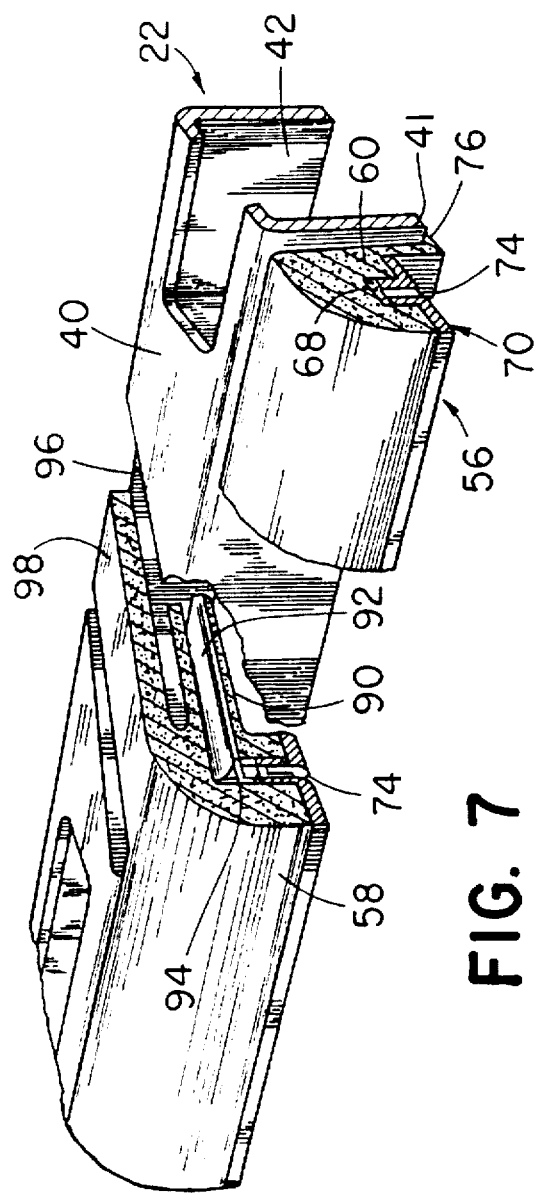
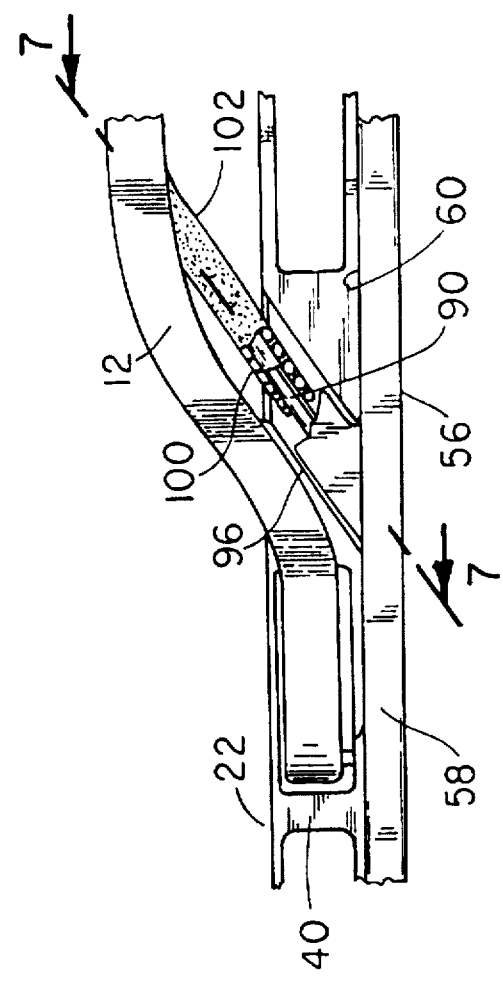

MOTOR VEHICLE WINDSCREEN WIPER COMPRISING AN IMPROVED SPRAY LINE

FIELD OF THE INVENTION

The present invention relates to a motor vehicle screen wiper, and the like.

BACKGROUND OF THE INVENTION

More particularly, the invention relates to a screen wiper of the type comprising a blade-carrying arm together with a screen wiper blade, which comprises an articulated pressure-distributing structure that includes at least one yoke articulated about a pivot axis at right angles to the general direction of the blade, the wiper being also of the type which includes a ramp for wetting the swept glass surface, this ramp extending at least partly along a lateral face of the screen wiper blade.

The arrangement of the wetting ramp along the screen wiper blade enables effective wetting to be obtained by good distribution of the points from which a washing product is sprayed onto the swept glass surface.

In this connection, the wetting ramp must be arranged as close as possible to the wiping zone, that is to say close to the wiping strip which is carried by the articulated pressure-distributing structure that carries the wiping strip.

In accordance with various known designs, it has previously been proposed to form the wetting ramp in the form of an independent component which generally takes the form of a rigid elongate body that is juxtaposed against a lateral face of the main yoke of the articulated structure, to which it is fixed by means of hooking clips, by elastic clipping or by fasteners such as screws, rivets, collars etc.

All of these designs have the disadvantage that they ar detrimental to the aerodynamic profile of the screen wiper blade, and are also detrimental to its general appearance.

It has also previously been proposed to integrate the wetting ramp into the screen wiper blade, or into one of the components of the blade where the latter are made by moulding in a plastics material.

Such a solution cannot however be achieved in all cases, and in particular where the articulated support structure is made by assembly and articulation of essentially metallic components.

SUMMARY OF THE INVENTION

An object of the present invention is to propose a new design for a screen wiper of the type mentioned above, and in particular for the means for fastening the wetting ramp which simplify mounting and fastening of the ramp, and which also enables a profiled wetting ramp body to be of an agreeable appearance, independently of the fastening means.

To this end, the invention proposes a motor vehicle screen wiper of the type mentioned above, characterised in that the wetting ramp is fixed at least to an end of the pivot pin which projects transversely towards the wetting ramp.

In accordance with further features of the invention:

each of the two opposed longitudinal ends of the wetting ramp is fixed on a projecting end of a pivot pin;

each of the two pivot pins provides articulation of a secondary yoke to the longitudinal end of a main yoke of the articulated structure, with the wetting ramp extending along the main yoke;

the wetting ramp has at least one transverse hooking lug, the end of which has a notch which cooperates with the lower edge of a side wall portion, in facing relationship with it, of a secondary yoke of the articulated structure;

the projecting free end of each pivot pin is received in a corresponding hole in the body of the wetting ramp;

the projecting free end of each pivot pin comprises an external radial collar received in the hole;

the body of the wetting ramp is formed by moulding, and the projecting free end of each pivot pin is encapsulated in the body of the wetting ramp by overmoulding;

the body of the wetting ramp is a profiled main piece which substantially matches the profile of the main yoke, the lower face of the main piece having a longitudinal groove that constitutes an internal channel for distribution of washing liquid, together with a closure plate which has a set of spray nozzles;

the main piece is formed by moulding and includes a duct for providing connection between the groove and a connection which is made integrally by moulding, for the connection of the wetting ramp to the end of a washing liquid supply tube carried by the screen wiper arm;

the connection extends transversely in a slot in a top spine portion of the main yoke;

the main piece of the body of the wetting ramp includes a cover flap which is made integrally by moulding and which extends parallel to the connection and above the latter, and which obturates the slot formed in the top spine portion of the main yoke;

the pivot pin is a pin providing articulation between a main yoke and a secondary yoke, and extending through the parallel side wing portions of the main yoke and the parallel side portions of the secondary yoke, and a noise deadening element is provided which comprises two parallel side walls interposed between the side wing portions of the main yoke and the side portions of the secondary yoke, with the pivot pin extending through the parallel side walls;

each side wall of the noise deadening element includes a bush for guiding the body of the pivot pin which extends transversely outwards through a hole formed in one side wing portion of the main yoke.

Further features and advantages of the invention will appear on a reading of the following detailed description, for an understanding of which reference is made to the attached drawings, in which:

BRIEF DESCRIPTION OF THE DRAWINGS

FIG. 2 is an exploded perspective detail view which shows a portion of the wetting ramp with which the screen wiper shown in FIG. 1 is equipped;

FIG. 3 is a view in cross section, taken on the line 3—3 in FIG. 2 and showing all of the components of the screen wiper in their assembled position;

FIG. 4a is a view in cross section, taken on the line 4—4 in FIG. 2 and showing the main yoke equipped with the wetting ramp;

FIG. 4b is a view in cross section showing a modified version of FIG. 4a;

FIG. 5 is a view similar to that in FIG. 2, showing another embodiment of the wetting ramp;

FIG. 6 is a top plan view of the central part of FIG. 1, showing the wetting ramp in its fitted position, together with its connection to the washing liquid supply tube; and FIG. 7 is a detailed perspective view on an enlarged scale, partly in cross section taken on the line 7—7 in FIG. 6.

DETAILED DESCRIPTION OF THE PREFERRED EMBODIMENTS

Figure 1:
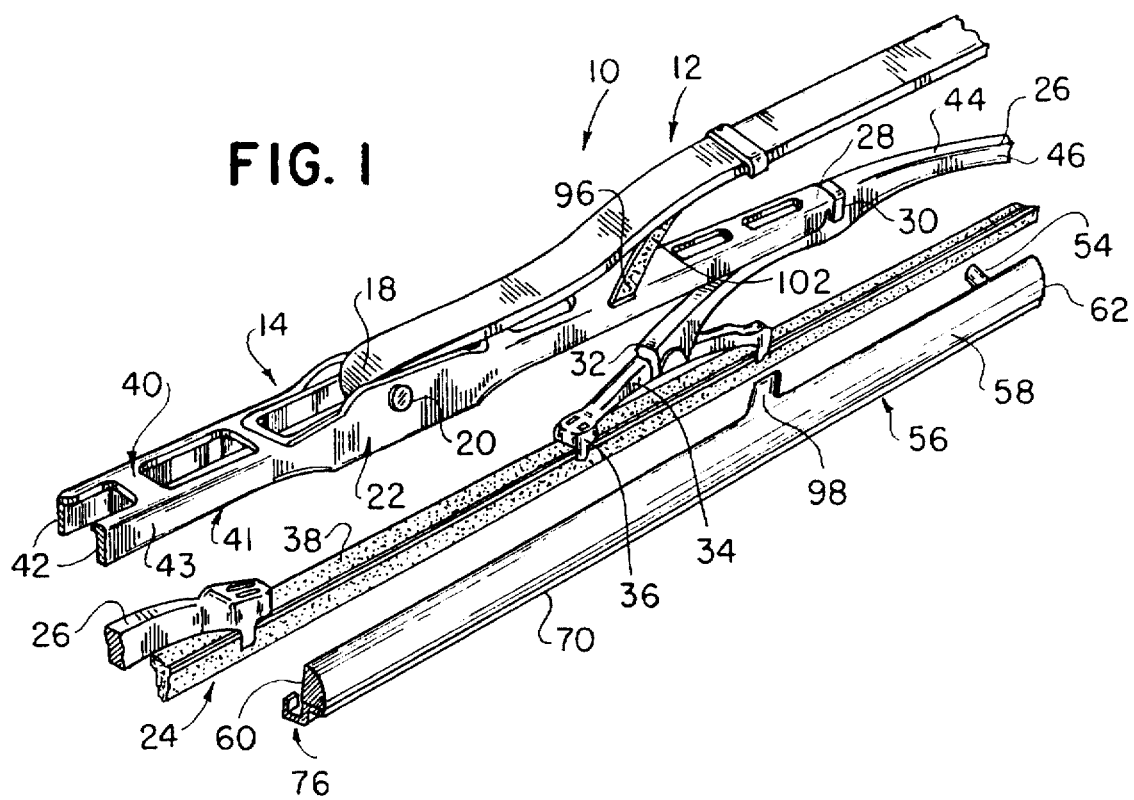
FIG. 1 is an exploded perspective view, shown partially cut away, which shows the main components of a screen wiper made in accordance with the provisions of the invention and equipped with a profiled wetting ramp.

FIG. 1 shows a screen wiper 10 which, in accordance with a known design, consists essentially of a blade-carrying screen wiper arm 12 together with a screen wiper blade 14, which is equipped with a wetting ramp made in accordance with the provisions of the invention.

The screen wiper arm 12 consists of a bar formed by bending from metal plate, the curved end 18 of which receives, articulated thereto about a pivot pin 20, a main yoke 22 which is part of an articulated structure for distributing the wiping pressure on a wiping strip 24.

For this purpose, the screen wiper blade 14 includes, besides the main yoke 22, two secondary yokes 26, each of which is articulated to one end 28 of the main yoke 22 about an axis parallel to the axis of the pivot pin 20, with a noise deadening element 30 being interposed.

Each secondary yoke 26 receives, articulated on its free end 32, a swingle bar 34, the terminal clips 36 of which support the gripping head 38 of the wiping strip 24.

The main yoke 22 is a component made from sheet metal by press-forming and bending, and consists essentially, when seen in cross section as shown in FIGS. 3 and 4, of a top spine portion 40 and two parallel side wing portions 42.

In the same way, each secondary yoke 26 has an inverted U-shaped profile in transverse cross section, and it accordingly comprises a top spine portion 44 and two parallel side portions 46.

As can be seen in FIG. 3, the noise deadening element 30 is a component of plastics material which is interposed between the end 28 of the main yoke 22 and the corresponding central part of the secondary yoke 26.

The noise deadening element has side walls 48 which are interposed between the side wing portions 42 and the side portions 46, with each wall including a bush 50, through which passes the cylindrical body, in the form of a metallic shank or rod 52, of a pivot pin 54 which articulates the secondary yoke 26 on the main yoke 22.

Also shown in the drawings is a wetting ramp 56 which, in accordance with the provisions of the invention, is fixed along one of the side wing portions 42 of the main yoke 22 through the interposed pivot pins 54.

As can be seen in the drawings, the ramp 56 consists essentially of a main piece 58 of moulded plastics material, which is a profiled component presenting a very good general appearance and defining a flat side surface 60, which is arranged to face towards the lateral surface 43 of the corresponding side wing portion 42 of the main yoke 22.

In order to provide a means for fastening it on the main yoke 22, and in the vicinity of each of its two opposed longitudinal ends 62, the body, in plastics material, of the main piece 58 is moulded in place on a head 64 of the shank 52 of the pivot pin 54, which is made in the form of a radial collar formed integrally with the shank 52.

The lower face 66 of the main piece 58 has an open longitudinal groove 68 which extends over substantially the whole major part of the ramp 56, and which constitutes the channel for distributing the washing liquid.

The lower face 66 and the groove 68 are closed and sealed by a member made in the form of a closure plate 70, which follows the contour of the lower face 66 and which has a longitudinal ridge 72 that is centred in the lower part of the groove 68 during assembly of the members 58 and 70, which is effected by heat welding or by adhesive bonding.

The closure plate 70 has a series of vertically open holes 74 which serve as nozzles for spraying the swept glass surface.

In order to complete the means for fastening and attachment of the wetting ramp 56 on the main yoke 22, a set of hooking lugs 76 is provided, these being spaced apart along the main piece 58, being formed integrally by moulding with the latter.

Each hooking lug 76 extends vertically downwards from the lower face 66, in the plane of the lateral surface 60, and includes a hook-shaped lug 78 which defines a slot 80, which is arranged to receive the corresponding portion of the lower edge 41 of the side wing portion 42 of the main yoke 22.

The side edge of the closure plate 70 is formed with notches 84, which correspond to the hooking lugs 76 so as to enable the components 58 and 70 to be assembled together.

In the modified embodiment shown in FIG. 5, the hooking lugs 76 are made integrally by moulding with the lower plate 70.

In the version shown in FIG. 4b, the ramp 56 consists of two elements 58, 70 which are assembled together in any way, for example adhesive bonding or welding in particular, along a plane parallel to the lateral surface 43 of the wing portion 42 of the yoke 22.

As can be seen in that Figure, the element 58, i.e. the main piece, includes the flat portion 60 described above, including the rods 52 and the hooks 78, and a part of the groove 68 and holes 74 is formed in the opposite surface. The element 70, i.e. the closure plate, is formed with the other part of the groove 68 and holes 74.

Thus, during the operation of assembling these two elements together along a substantially vertical plane, a ramp 56 will be obtained which has a groove 68 communicating with the holes 74, which constitute nozzles for the wash-wipe liquid.

The supply of washing liquid to the groove 68 will now be described, with reference to FIGS. 6 and 7 in particular.

As can be seen in these Figures, a connection 90 is made integrally by moulding with the piece 58, and its internal duct 92 is connected to the groove 68 through a vertical duct 94.

The connection 90 extends transversely in a complementary slot 96 which is formed in the top spine portion 40 of the main yoke 22, this slot being masked, when the wetting ramp 56 is fitted in position, by a cover flap 98 which is made integrally by moulding with the main element 58 of the wetting ramp 56, the form of the cover flap being complementary with that of the slot 96.

Thus, in the fitted position and as can be seen in FIGS. 6 and 7, the upper surface of the spine portion 40 is of substantially continuous form, which improves even more the appearance of the assembly.

The connection 90 is arranged to receive the end 100 of a flexible tube 102 which is carried by the lower face of the screen wiper arm 12, and which is connected to a source of supply of washing liquid under pressure.

Fastening of the wetting ramp 56 on the main yoke 22 is carried out after the secondary yokes 26, with the noise deadening elements 30, have been positioned, and consists in inserting the pivot pins 54 carried by the main piece 58 into the bushes 50, in which the body of the rod 52 may for example be held gripped.

It is also possible, in another version, to make the free end of the rods 52 in the form of rivets, so as to render the assembly incapable of being dismantled, and so as to provide the articulation.

The invention is not limited to the embodiment just described.

Numerous modified embodiments of the connection between the rod 52 which constitutes the pivot pin and the main piece 58 of the wetting ramp 56 are possible.

It is for example possible to form in the body of the piece 58 slots in the form of an inverted U, open downwardly so as to enable the piece 58 to be fitted in mating engagement on the heads 64 of the pivot pins 54, the latter having previously been positioned on the yokes 22 and 26.

Other embodiments are also possible, being in the form of harpoons which are inserted into the body of the main piece 58.

It is also possible to arrange that the smooth ends of the rods 52 that constitute the pivot pins 54 are force-fitted into complementary holes formed in the body of the main piece 58.

In addition, it can also be arranged that the free ends 74 of the ramp 56 can carry wash-wipe liquid nozzles which are attached as shown in broken lines in FIG. 1, these nozzles being in communication with the duct 68 for the purpose of projecting some of the liquid.

What is claimed is:

1. A screen wiper assembly for discharging a screen washing product therefrom, said assembly having a blade-carrying arm coupled with a generally parallel screen wiper blade having an external lateral surface, said blade comprises an articulated pressure-distributing structure including at least one elongated main yoke with a first secondary yoke articulated thereto about a first pivot pin generally at right angles to the screen wiper blade, the first pivot pin having at least one end, and including an elongated wetting ramp of which substantially the entire length thereof bears against the screen wiper blade external surface for discharging the screen washing product, the wetting ramp extending externally of the screen wiper blade and at least partly along the external lateral surface of the screen wiper blade, the wetting ramp being fixed to at least the end of the pivot pin which projects transversely towards the wetting ramp.

2. A screen wiper according to claim 1, wherein the wetting ramp has two opposed longitudinal ends, the pivot pin end being a projecting end, one of the two opposed longitudinal ends of the wetting ramp being fixed on the projecting end of the pivot pin.

3. A screen wiper according to claim 2, further comprising a second pivot pin, a second secondary yoke articulated on the second pivot pin to the main yoke with the wetting ramp extending along the articulated structure yoke.

4. A screen wiper according to claim 1, further comprising a plurality of pivot pins, each of said pins having a respective projecting free end, the wetting ramp having a plurality of holes formed therein, the projecting free end of each pivot pin is received in a corresponding hole in the wetting ramp.

5. A screen wiper according to claim 4, wherein the projecting free end of each pivot pin comprises an external radial collar received in each of the respective holes.

6. A screen wiper according to claim 1, wherein the wetting ramp further comprises a molded structure, and in that the projecting pivot pin end is overmolded into the wetting ramp.

7. A screen wiper according to claim 6, wherein the wetting ramp further comprises a main piece and a cover plate joined in a plane parallel to the lateral surface of the screen wiper blade.

8. A screen wiper according to claim 1, in that the wetting ramp further comprises a main piece and a cover plate, the main piece and the cover plate being assembled together in a plane parallel to the lateral surface of the screen wiper blade.

9. A screen wiper according to claim 8, wherein the main piece further comprises a molding with a groove formed therein and having a duct for establishing communication with the groove and a connection molded in the main piece to couple the wetting ramp to a screen washing product supply tube, the screen washing product supply tube being carried by the blade carrying arm.

10. A screen wiper according to claim 1, wherein the pivot pin is a pin for articulating the articulated structure wherein the main yoke further comprises parallel side wing portions, said first secondary yoke having side portions, the pivot pin extending through the parallel side wing portions of the main yoke and the parallel side portions of the first secondary yoke, a sound deadening element having two parallel side walls interposed between the side wing portions of the main yoke and the side portions of the first secondary yoke, with the pivot pin extending through the side wing portions of the main yoke, the side portions of the first secondary yoke and the side walls of the sound deadening element.

11. A screen wiper according to claim 10, further comprising a hole formed in one of the side wing portions of the main yoke, a bush in each side wall of the sound deadening element for guiding the pivot pin which extends transversely outwards through the hole formed in the one side wing portion of the main yoke.

12. A screen wiper for discharging a screen washing product therefrom having a blade-carrying arm coupled with a generally parallel screen wiper blade having a lateral surface, said wiper blade comprises an articulated pressure-distributing structure including at least one main yoke with a secondary yoke articulated thereto about a pivot pin generally at right angles to the screen wiper blade, the main yoke having a side wing portion with an edge thereon, the pivot pin having at least one end, and which includes a wetting ramp for discharging the screen washing product, the wetting ramp extending at least partly along the lateral surface of the screen wiper blade, the wetting ramp being fixed to at least the end of the pivot pin, which projects transversely towards the the wetting ramp has at least one transverse hooking lug having an end with a notch formed therein which cooperates with the edge of the side wing portion, in facing relationship with the main yoke of the articulated structure.

13. A screen wiper for discharging a screen washing product therefrom having a blade-carrying arm together with a generally parallel screen wiper blade having a lateral surface, said wiper blade comprises an articulated pressure-distributing structure including at least one profiled yoke articulated about a pivot pin generally at right angles to the screen wiper blade, the pivot pin having at least one end, a wetting ramp for discharging the screen washing product, the wetting ramp extending at least partly along the lateral surface of the screen wiper blade, the wetting ramp being fixed to at least the end of the pivot pin, which projects transversely towards the wetting ramp, a body of the wetting ramp having a profiled main piece which substantially matches the profile of the yoke, the main piece having a longitudinal groove forming an internal channel for distribution of the screen washing product, and a closure plate having a set of spray nozzles formed therein, the closure plate closing the longitudinal groove.

14. A screen wiper according to claim 13 further comprising a screen washing product supply tube having at least one end, the main piece being molded and including a duct for establishing communication with the groove and a connection molded in the main piece to couple the wetting ramp to the end of the screen washing product supply tube, the screen washing product supply tube being carried by the screen wiper arm.

15. A screen wiper according to claim 14, wherein the yoke has a spine portion, the spine portion having a transverse slot formed therein the connection extending transversely in the slot in the spine portion of the articulated structure yoke.

16. A screen wiper according to claim 15, wherein the main piece of the wetting ramp further comprises a cover flap integral with the main piece and parallel to the connection and spaced therefrom, obturating the slot formed in the spine portion of the articulated structure yoke.

* * * * *